United States Patent
Lee et al.

(10) Patent No.: US 11,503,651 B2
(45) Date of Patent: Nov. 15, 2022

(54) APPARATUS AND METHOD FOR TRANSMITTING AND RECEIVING ASYNCHRONOUS SIGNAL IN WIRELESS COMMUNICATION SYSTEM

(71) Applicants: Samsung Electronics Co., Ltd., Suwon-si (KR); Industry-Academic Cooperation Foundation, Yonsei University, Seoul (KR)

(72) Inventors: Kwonjong Lee, Suwon-si (KR); Daesik Hong, Seoul (KR); Soohyun Kim, Seoul (KR); Hyojin Lee, Suwon-si (KR); Seungil Park, Suwon-si (KR); Hakkeon Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 4 days.

(21) Appl. No.: 17/009,630

(22) Filed: Sep. 1, 2020

(65) Prior Publication Data
US 2021/0068163 A1 Mar. 4, 2021

(30) Foreign Application Priority Data
Sep. 2, 2019 (KR) .................. 10-2019-0108249

(51) Int. Cl.
*H04W 74/08* (2009.01)
*H04W 72/12* (2009.01)
(Continued)

(52) U.S. Cl.
CPC ....... *H04W 74/0833* (2013.01); *H04L 1/0048* (2013.01); *H04L 1/18* (2013.01);
(Continued)

(58) Field of Classification Search
None
See application file for complete search history.

(56) References Cited

U.S. PATENT DOCUMENTS 10,531,432 B2  1/2020  Ma et al.
2020/0092056 A1*  3/2020  Lei .............. H04L 5/0091
(Continued)

FOREIGN PATENT DOCUMENTS

KR  10-1882464 B1  7/2018

OTHER PUBLICATIONS

Wunder et al., "Compressive Coded Random Access for Massive MTC Traffic in 5G Systems", IEEE, 2015, 5 pages.
(Continued)

*Primary Examiner* — Marcus Smith

(57) ABSTRACT

The present disclosure relates to a communication method and system for converging a 5th-generation (5G) communication system or a 6th-generation (6G) communication system for supporting higher data rates beyond a 4th-generation (4G) system. The disclosure relates to an operating method of a terminal in a wireless communication system. The method may include: receiving configuration information about a plurality of signatures for non-orthogonal multiple access (NOMA) from a base station, the plurality of signatures including first signatures and second signatures; identifying a first signature sequence for the terminal, based on the configuration information; and transmitting data, configured based on the identified first signature sequence, to the base station, wherein the first signature sequence may be configured by repeating the first signatures, and the first signatures may be respectively applied to consecutive symbols of the data.

8 Claims, 10 Drawing Sheets

(51) Int. Cl.
  *H04W 48/12* (2009.01)
  *H04L 1/18* (2006.01)
  *H04W 76/27* (2018.01)
  *H04W 74/00* (2009.01)
  *H04L 1/00* (2006.01)

(52) U.S. Cl.
  CPC ....... *H04W 48/12* (2013.01); *H04W 72/1289* (2013.01); *H04W 74/002* (2013.01); *H04W 74/0866* (2013.01); *H04W 76/27* (2018.02)

(56) References Cited

U.S. PATENT DOCUMENTS

| | | | |
|---|---|---|---|
| 2020/0146026 A1* | 5/2020 | Shimezawa | H04W 74/08 |
| 2020/0413413 A1* | 12/2020 | Haghighat | H04W 72/0446 |
| 2021/0067300 A1* | 3/2021 | Pan | H04B 17/309 |
| 2021/0100002 A1* | 4/2021 | Pan | H04W 74/006 |
| 2021/0144037 A1* | 5/2021 | Yamamoto | H04L 1/02 |
| 2021/0307003 A1* | 9/2021 | Chou | H04W 74/0833 |

OTHER PUBLICATIONS

Ping et al., "Interleave-Division Multiple-Access", IEEE Transactions on Wireless Communications, vol. 5, No. 4, Apr. 2006, 10 pages.

Zong et al., "Partial Sampling MMSE Interference Suppression in Asynchronous Multicarrier CDMA System", IEEE Journal on Selected Areas in Communications, vol. 19, No. 8, Aug. 2001, 9 pages.

Nokia et al., "Synchronization requirement and performance analysis on UL MA", 3GPP TSG-RAN WG1 #86, Aug. 22-26, 2016, R1-167251, 4 pages.

Huawei et al., "Other issues for 2-step RACH", 3GPP TSG RAN WG1 Meeting #96, Feb. 25-Mar. 1, 2019, R1-1903058, 3 pages.

ZTE, "Summary of 7.2.1.1 Channel Structure for Two-step RACH", 3GPP TSG RAN WG1 #96, Feb. 25-Mar. 1, 2019, R1-1903435, 28 pages.

ZTE Corporation et al., "New work item: 2-step RACH for NR", 3GPP TSG RAN Meeting #82, Dec. 10-13, 2018, RP-182894, 5 pages.

\* cited by examiner

APPARATUS AND METHOD FOR TRANSMITTING AND RECEIVING ASYNCHRONOUS SIGNAL IN WIRELESS COMMUNICATION SYSTEM

CROSS-REFERENCE TO RELATED APPLICATION

This application is based on and claims priority under 35 U.S.C. 119 to Korean Patent Application No. 10-2019-0108249 filed on Sep. 2, 2019, in the Korean Intellectual Property Office, the disclosure of which is herein incorporated by reference in its entirety.

BACKGROUND

1. Field

The disclosure generally relates to a wireless communication system and, more particularly, to an apparatus and a method for transmitting and receiving an asynchronous signal in a wireless communication system.

2. Description of Related Art

Considering the development of mobile communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as Beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the ¹⁄₁₀ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; an improved network structure for supporting mobile nodes B and the like and enabling network operation optimization and automation and the like; an use of AI in wireless communication for improvement of overall network operation by considering AI from the initial phase of developing technologies for 6G and internalizing end-to-end AI support functions; and a next-generation distributed computing technology for overcoming the limit of UE computing ability through reachable super-high-performance communication and computing resources (MEC, clouds, and the like) over the network.

It is expected that such research and development of 6G communication systems will bring the next hyper-connected experience to every corner of life. Particularly, it is expected that services such as truly immersive XR, high-fidelity mobile hologram, and digital replica could be provided through 6G communication systems.

In addition, techniques related to a simplified initial access method in a next-generation wireless communication system are emerging. Accordingly, there is a need for methods for efficiently transmitting and receiving signals for initial access of a plurality of terminals in a system supporting NOMA.

The above information is presented as background information only to assist with an understanding of the disclosure. No determination has been made, and no assertion is made, as to whether any of the above might be applicable as prior art with regard to the disclosure.

SUMMARY

Based on the foregoing discussion, the disclosure provides an apparatus and a method for effectively transmitting and receiving an asynchronous signal in a wireless communication system.

Further, the disclosure provides an apparatus and a method for effectively decoding asynchronous signals transmitted from a plurality of terminals in a wireless communication system supporting NOMA.

In addition, the disclosure provides an apparatus and a method for determining signatures used to effectively decode asynchronous signals transmitted from a plurality of terminals in a wireless communication system supporting NOMA.

According to various embodiments, an operating method of a terminal in a wireless communication system may include: receiving configuration information about a plurality of signatures for non-orthogonal multiple access (NOMA) from a base station, the plurality of signatures including first signatures and second signatures; identifying a first signature sequence for the terminal, based on the configuration information; and transmitting data configured based on the identified first signature sequence to the base station, wherein the first signature sequence may be configured by repeating the first signatures, and the first signatures may be respectively applied to consecutive symbols of the data.

According to various embodiments, an operating method of a base station in a wireless communication system may include: transmitting configuration information about a plurality of signatures for non-orthogonal multiple access (NOMA), the plurality of signatures including first signatures and second signatures; identifying a first signature sequence for a first terminal, based on signals received from a plurality of terminals including the first terminal; and decoding data received from the first terminal, based on the identified first signature sequence, wherein the first signature sequence may be configured by repeating the first signatures, and the first signatures may be respectively applied to consecutive symbols of the data.

According to various embodiments, a terminal in a wireless communication system may include: a transceiver; and at least one processor configured to be operatively connected to the transceiver, wherein the at least one processor may be configured to: receive configuration information about a plurality of signatures for non-orthogonal multiple access (NOMA) from a base station, the plurality of signatures including first signatures and second signatures; identify a first signature sequence for the terminal, based on the configuration information; and transmit data configured based on the identified first signature sequence to the base station, the first signature sequence may be configured by repeating the first signatures, and the first signatures may be respectively applied to consecutive symbols of the data.

According to various embodiments, a base station in a wireless communication system may include: a transceiver; and at least one processor configured to be operatively connected to the transceiver, wherein the at least one processor may be configured to: transmit configuration information about a plurality of signatures for non-orthogonal multiple access (NOMA), the plurality of signatures including first signatures and second signatures; identify a first signature sequence for a first terminal, based on signals received from a plurality of terminals including the first terminal; and decode data received from the first terminal, based on the identified first signature sequence, the first signature sequence may be configured by repeating the first signatures, and the first signatures may be respectively applied to consecutive symbols of the data.

When a simplified initial access procedure is performed in a wireless communication system supporting non-orthogonal multiple access (NOMA), an apparatus and a method according to various embodiments may effectively decode signals asynchronously received from a plurality of terminals, thereby improving reception performance of a base station.

Effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure described below relates to an apparatus and a method for transmitting and receiving an asynchronous signal in a wireless communication system. Specifically, the disclosure illustrates a technique for effectively decoding asynchronous signals asynchronously received by determining a signature to prevent a collision between signatures in a wireless communication system supporting non-orthogonal multiple access (NOMA).

As used herein, terms referring to signals, terms referring to channels, terms referring to control information, terms referring to network entities, terms referring to components of an apparatus, and the like are used for convenience of explanation. Therefore, the disclosure is not limited by the following terms, and other terms having equivalent technical meanings may be used.

Further, although the disclosure illustrates various embodiments using terms used in some communication standards (e.g., 3rd Generation Partnership Project (3GPP)), these standards are provided merely for convenience of description. Various embodiments of the disclosure may be easily modified and applied to other communication systems.

Figure 1:
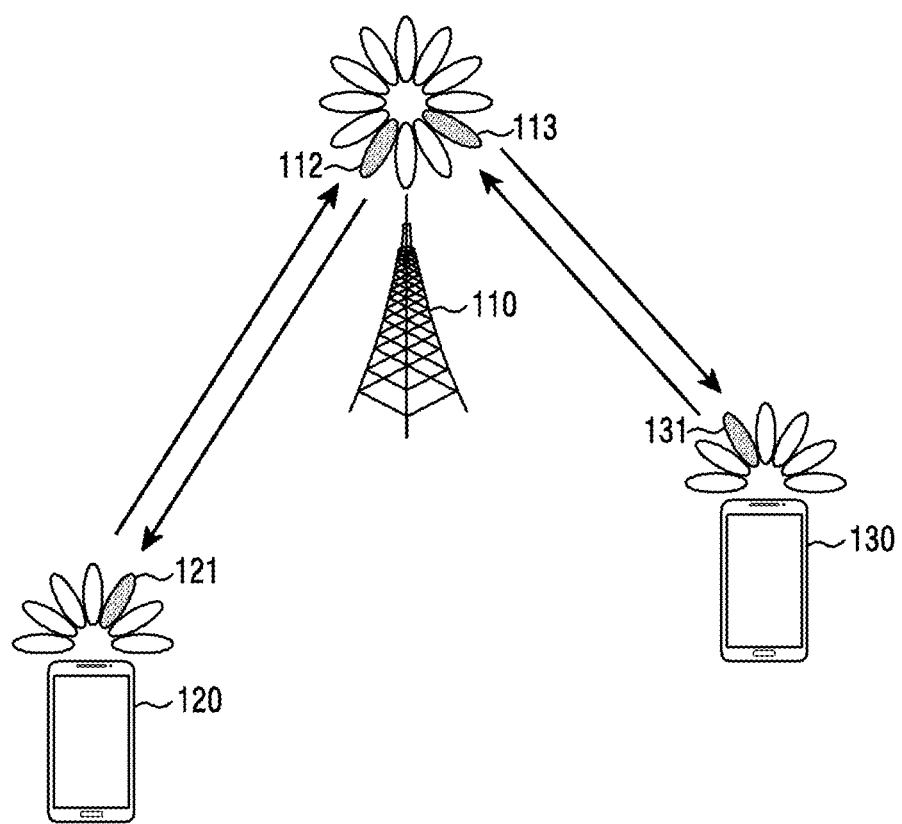
FIG. 1 illustrates a wireless communication system according to various embodiments.

FIG. 1 illustrates a wireless communication system according to various embodiments of the disclosure. FIG. 1 illustrates a base station 110, a terminal 120, and a terminal 130 as some nodes using a wireless channel in the wireless communication. Although FIG. 1 shows only one base station, another base station equivalent or similar to the base station 110 may be further included.

The base station 110 is a piece of network infrastructure that provides wireless access for the terminals 120 and 130. The base station 110 has coverage defined as a certain geographic area based on the distance over which the base station 110 can transmit a signal. The base station 110 may be referred to as an access point (AP), an eNodeB (eNB), a 5th-generation (5G) node, a next-generation nodeB (gNB), a wireless point, a transmission/reception point (TRP), or other terms with equivalent technical meanings, in addition to a base station.

Each of the terminal 120 and the terminal 130 is a device used by a user and performs communication with the base station 110 through a wireless channel. In some cases, at least one of the terminal 120 or the terminal 130 may be operated without a user's involvement. That is, at least one of the terminal 120 or the terminal 130 may be a device performing machine-type communication (MTC) and may not be carried by a user. Each of the terminal 120 and the terminal 130 may be referred to as user equipment (UE), a mobile station, a subscriber station, a remote terminal, a wireless terminal, a user device, or other terms with equivalent technical meanings, in addition to a terminal.

The base station 110, the terminal 120, and the terminal 130 may transmit and receive radio signals in a millimeter wave (mmWave) band (e.g., 28 GHz, 30 GHz, 38 GHz, and 60 GHz). Here, in order to improve channel gain, the base station 110, the terminal 120, and the terminal 130 may perform beamforming. Here, beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 through a beam search procedure or a beam management procedure. After the serving beams 112, 113, 121, and 131 are selected, subsequent communication may be performed through resources that are in a quasi co-located (QCL) relationship with the resources used to transmit the serving beams 112, 113, 121, and 131.

When the large-scale characteristics of a channel carrying a symbol on a first antenna port can be inferred from a channel carrying a symbol on a second antenna port, the first antenna port and the second antenna port may be said to be in a QCL relationship. For example, the large-scale characteristics may include at least one of a delay spread, a Doppler spread, a Doppler shift, an average gain, an average delay, or a spatial receiver parameter.

Figure 2:
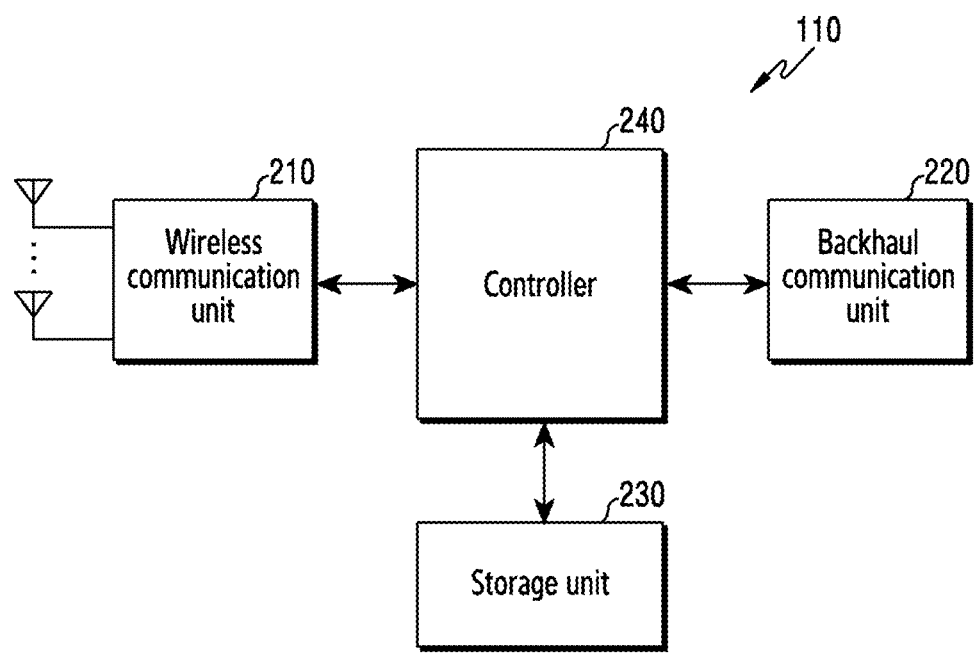
FIG. 2 illustrates a block diagram of a base station in a wireless communication system according to various embodiments.

FIG. 2 illustrates a block diagram of a base station in a wireless communication system according to various embodiments. The configuration illustrated in FIG. 2 may be construed as the configuration of the base station 110. The terms "unit," "-or/er," and the like used herein indicate a unit for processing at least one function or operation, which may be implemented as hardware, software, or a combination thereof.

Referring to FIG. 2, the base station includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bit stream according to the physical-layer specification of a system. For example, in data transmission, the wireless communication unit 210 encodes and modulates a transmitted bit stream to generate complex symbols. Further, in data reception, the wireless communication unit 210 demodulates and decodes a baseband signal to reconstruct a received bit stream.

The wireless communication unit 210 upconverts a baseband signal into a radio-frequency (RF) band signal and may transmit the RF band signal through an antenna. The wireless communication unit 210 downconverts an RF band signal, received through the antenna, into a baseband signal. To this end, the wireless communication unit 210 may include a transmission filter, a reception filter, an amplifier, a mixer, an oscillator, a digital-to-analog converter (DAC), an analog-to-digital converter (ADC), or the like. Further, the wireless communication unit 210 may include a plurality of transmission/reception paths. In addition, the wireless communication unit 210 may include at least one antenna array including a plurality of antenna elements.

From the aspect of hardware, the wireless communication unit 210 may include a digital unit and an analog unit, and the analog unit may include a plurality of sub-units according to operating power, operating frequency, or the like. The digital unit may be configured as at least one processor (e.g., a digital signal processor (DSP)).

As described above, the wireless communication unit 210 transmits and receives a signal. Accordingly, part or all of the wireless communication unit 210 may be referred to as a transmitter, a receiver, or a transceiver. In the following description, transmission and reception performed through a wireless channel are construed as including processing performed as described above by the wireless communication unit 210.

The backhaul communication unit 220 provides an interface for communication with other nodes in a network. That is, the backhaul communication unit 220 converts a bit stream, which is transmitted from the base station to another node, for example, another access node, another base station, a higher node, a core network, or the like, into a physical signal, and converts a physical signal, which is received from another node, into a bit stream.

The storage unit 230 stores data, such as a default program, an application, and setting information, for the operation of the base station. The storage unit 230 may be configured as volatile memory, nonvolatile memory, or a combination of volatile memory and nonvolatile memory. The storage unit 230 provides the stored data in response to a request from the controller 240.

The controller 240 controls the overall operation of the base station. For example, the controller 240 transmits and receives a signal through the wireless communication unit 210 or the backhaul communication unit 220. Further, the controller 240 records and reads data in the storage unit 230. The controller 240 may perform functions of a protocol stack required by communication standards. According to another embodiment, the protocol stack may be included in the wireless communication unit 210. To this end, the controller 240 may include at least one processor.

According to various embodiments, the controller 240 may control the base station to perform operations according to various embodiments to be described below.

Figure 3:
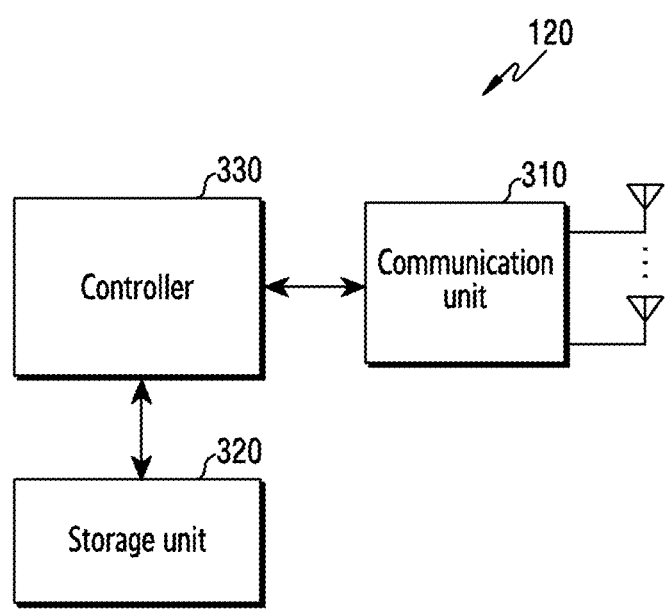
FIG. 3 illustrates a block diagram of a terminal in a wireless communication system according to various embodiments.

FIG. 3 illustrates a block diagram of a terminal in a wireless communication system according to various embodiments. The configuration illustrated in FIG. 3 may be construed as the configuration of the terminal 120. The terms "unit," "-or/er," and the like used herein indicate a unit for processing at least one function or operation, which may be implemented as hardware, software, or a combination thereof.

Referring to FIG. 3, the terminal includes a communication unit 310, a storage unit 320, and a controller 330.

The communication unit 310 performs functions for transmitting or receiving a signal through a wireless channel. For example, the communication unit 310 performs a function of converting between a baseband signal and a bit stream according to the physical-layer specification of a system. For example, in data transmission, the communication unit 310 encodes and modulates a transmitted bit stream to generate complex symbols. Further, in data reception, the communication unit 310 demodulates and decodes a baseband signal to reconstruct a received bit stream. The communication unit 310 upconverts a baseband signal into an RF band signal and transmits the RF band signal through an antenna. The communication unit 310 downconverts an RF band signal, received through the antenna, into a baseband signal. For example, the communication unit 310 may include a transmission filter, a reception filter, an amplifier, a mixer, an oscillator, a DAC, an ADC, or the like.

Further, the communication unit 310 may include a plurality of transmission/reception paths. In addition, the communication unit 310 may include at least one antenna array including a plurality of antenna elements. From the aspect of hardware, the communication unit 310 may include a digital circuit and an analog circuit (e.g., a radio frequency integrated circuit (RFIC)). Here, the digital circuit and the analog circuit may be configured as a single package. Further, the communication unit 310 may include a plurality of RF chains. The communication unit 310 may perform beamforming.

As described above, the communication unit 310 transmits and receives a signal. Accordingly, part or the entirety of the communication unit 310 may be referred to as a transmitter, a receiver, or a transceiver. In the following description, transmission and reception performed through a wireless channel are construed as including processing performed as described above by the communication unit 310.

The storage unit 320 stores data, such as a default program, an application, and setting information, for the operation of the terminal. The storage unit 320 may be configured as volatile memory, nonvolatile memory, or a combination of volatile memory and nonvolatile memory. The storage unit 320 provides the stored data in response to a request from the controller 330.

The controller 330 controls the overall operation of the terminal. For example, the controller 330 transmits and receives a signal through the communication unit 310. Further, the controller 330 records and reads data in the storage unit 320. The controller 330 may perform functions of a protocol stack required by communication standards. To this end, the controller 330 may include at least one processor or microprocessor or may be configured as a part of a processor. Part of the communication unit 310 and the controller 330 may be referred to as a communication processor (CP).

According to various embodiments, the controller 330 may control the terminal to perform operations according to various embodiments to be described below.

Figure 4:
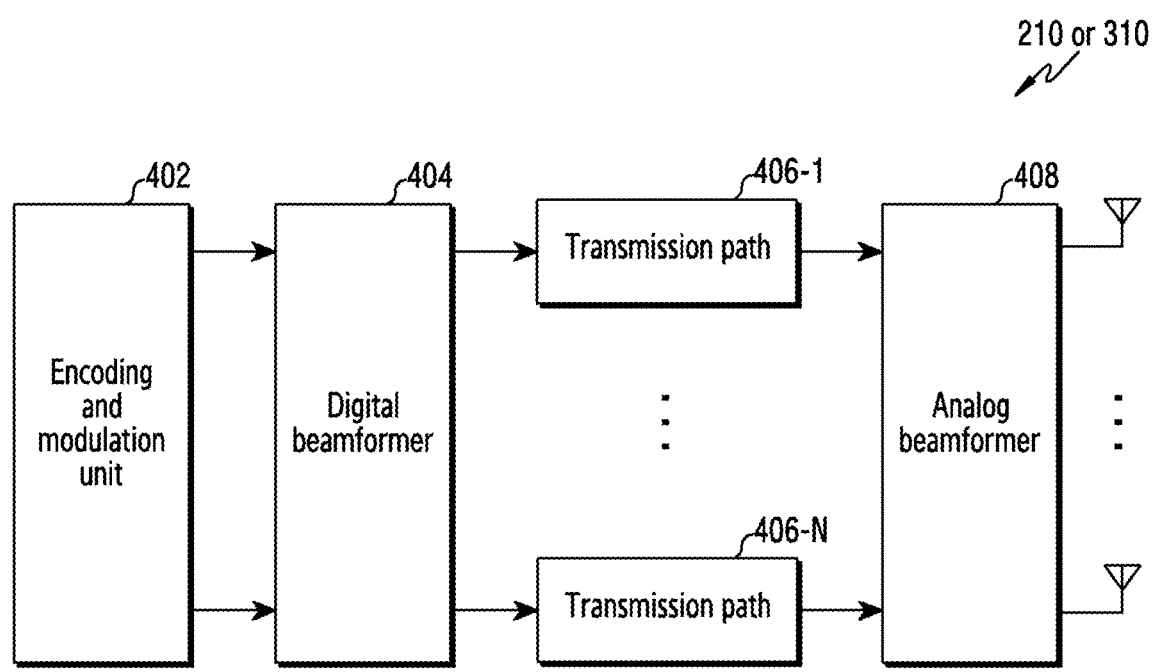
FIG. 4 illustrates a block diagram of a communication unit in a wireless communication system according to various embodiments.

FIG. 4 illustrates a block diagram of a communication unit in a wireless communication system according to various embodiments. FIG. 4 illustrates an example of the detailed configuration of the wireless communication unit 210 in FIG. 2 or the communication unit 310 in FIG. 3. Specifically, FIG. 4 illustrates components for performing beamforming as part of the wireless communication unit 210 in FIG. 2 or the communication unit 310 in FIG. 3.

Referring to FIG. 4, the wireless communication unit 210 or the communication unit 310 includes an encoding and modulation unit 402, a digital beamformer 404, a plurality of transmission paths 406-1 to 406-N, and an analog beamformer 408.

The encoding and modulation unit 402 performs channel encoding. For channel encoding, at least one of low-density parity-check (LDPC) code, convolutional code, or polar code may be used. The encoding and modulation unit 402 generates modulation symbols by performing constellation mapping.

The digital beamformer 404 performs beamforming on a digital signal (e.g., the modulation symbols). To this end, the digital beamformer 404 multiplies the modulation symbols by beamforming weights. Here, the beamforming weights are used to change the size and phase of a signal and may be referred to as a "precoding matrix," a "precoder," or the like. The digital beamformer 404 outputs the digital-beamformed modulation symbols to the plurality of transmission paths 406-1 to 406-N. Here, according to a multiple-input multiple-output (MIMO) transmission scheme, the modulation symbols may be multiplexed, or the same modulation symbols may be provided to the plurality of transmission paths 406-1 to 406-N.

The plurality of transmission paths 406-1 to 406-N converts the digital-beamformed digital signals into analog signals. To this end, each of the plurality of transmission paths 406-1 to 406-N may include an inverse fast Fourier transform (IFFT) operation unit, a cyclic prefix (CP) inserter, a DAC, and an upconverter. The CP inserter is for an orthogonal frequency division multiplexing (OFDM) scheme and may be excluded when another physical layer scheme (e.g., filter bank multi-carrier (FBMC)) is applied. That is, the plurality of transmission paths 406-1 to 406-N provides independent signal processing processes for a plurality of streams generated through digital beamforming. However, some components of the plurality of transmission paths 406-1 to 406-N may be used in common depending on the implementation scheme.

The analog beamformer 408 performs beamforming on the analog signals. To this end, the digital beamformer 404 multiplies the analog signals by beamforming weights. Here, the beamforming weights are used to change the size and phase of a signal. Specifically, the analog beamformer 408 may be variously configured depending on the connection structure between the plurality of transmission paths 406-1 to 406-N and antennas. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array or may be connected to two or more antenna arrays.

In an LTE system, a terminal performs procedures for establishing a radio link with a base station, a scheduling request, and approval in order to transmit uplink data. In this case, various control signals need to be transmitted and received between the terminal and the base station. However, in transmission and reception of the control signals, overhead due to the control signals may occur in an environment in which a plurality of terminals exists. Accordingly, studies are being conducted on a method for reducing overhead due to control signals exchanged between a terminal and a base station in a next-generation mobile communication system. For example, in an initial access procedure, a simplified random access (or referred to as two-step random access) technique for minimizing signaling of control signals has emerged.

According to the simplified random access method, after transmitting a preamble indicating an access attempt, terminals may immediately transmit uplink data to a base station without waiting for a response signal (e.g., a random access response (RAR)) to the preamble from the base station.

However, in this case, since each terminal transmits a signal without receiving individual scheduling from the base station, signals of the terminals may overlap. Therefore, a non-orthogonal multiple access (NOMA) technique may be taken into consideration so that the base station separately receives the overlapping signals. The NOMA scheme is a technique for effectively overlapping signals using various multiple access signatures (MA signatures) for distinguishing overlapping signals. Various methods, such as those using a codebook, a sequence, an interleaver, and time and frequency resources, may be used for MA signatures. Through the NOMA scheme described above, it is possible to reduce the likelihood of a collision between signals that may occur when uplink signals transmitted from a plurality of terminals are received on the same resource.

As described above, in a system in which a terminal transmits uplink data without receiving a response from a base station, since a timing advance procedure for aligning timing for a terminal is omitted, the base station asynchronously receives signals that are transmitted from terminals and have undergone different time delays. In particular, when orthogonal frequency-division multiplexing (OFDM) is used, a plurality of signals is received on the same resource, and thus inter-symbol interference (ISI) and inter-carrier interference (ICI) may occur between asynchronously received signals. Therefore, when one FFT window is used in an NOMA system in which asynchronous transmission is performed, an OFDM symbol of each terminal is not completely captured, and thus power loss may occur. That is, due to power loss of a signal, the probability of successfully decoding a signal received from each terminal may be reduced. Further, in a method of using at least one FFT window configured based on a different timing for a signal of each terminal in order to remove interference caused by asynchronous transmission, the complexity of a receiver may be increased, and interference by a signal of a different terminal in the window may not be considered. Accordingly, a method for improving reception performance of a signal in view of interference in a system supporting NOMA is needed.

Hereinafter, a multi-user detection (MUD) scheme for improving reception performance by removing interference in a wireless communication system supporting NOMA will be described in detail with reference to FIG. 5 and FIG. 6.

Figure 5:
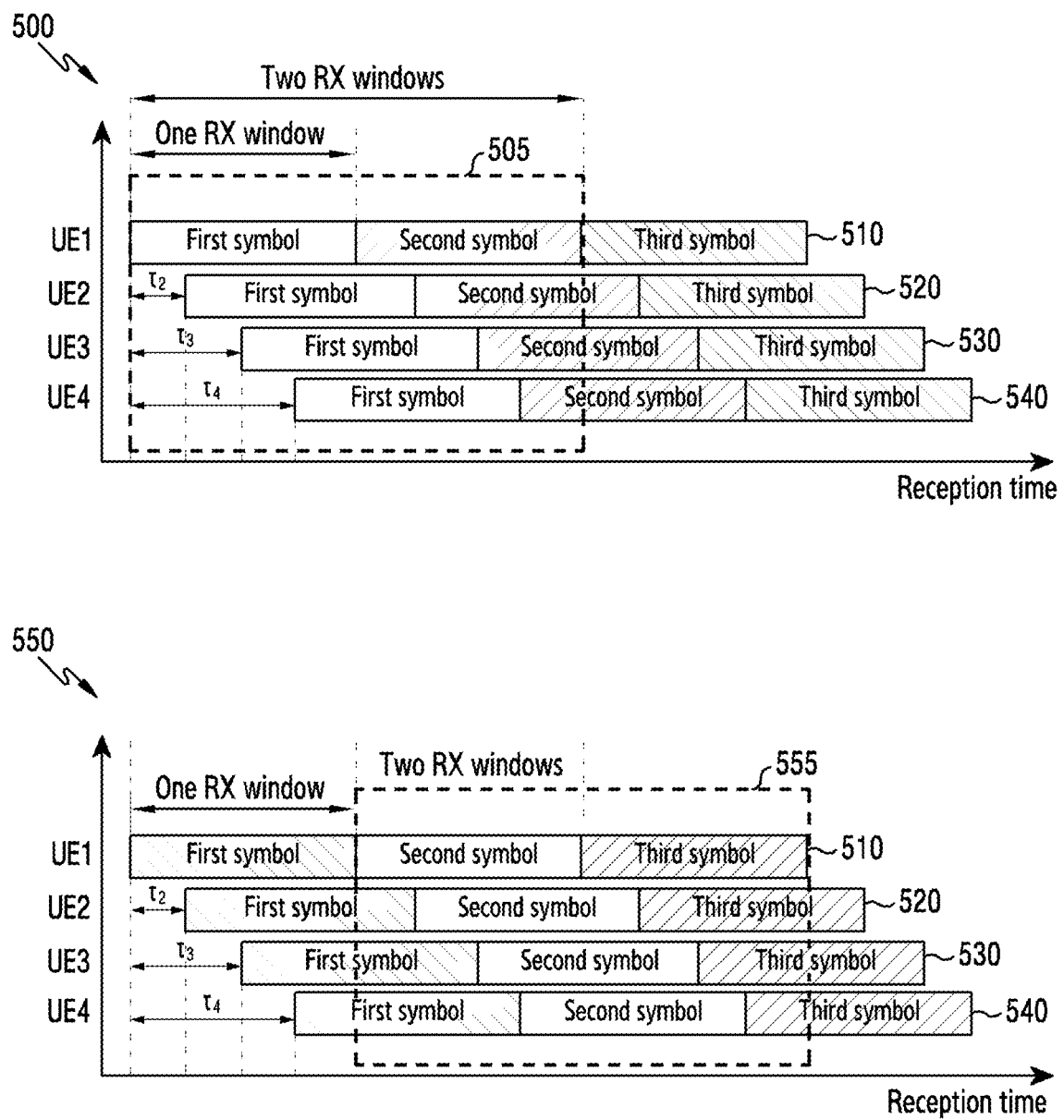
FIG. 5 illustrates an example of a reception scheme based on a plurality of reception windows in a wireless communication system according to various embodiments.

FIG. 5 illustrates an example of a reception scheme based on a plurality of reception windows in a wireless communication system according to various embodiments. FIG. 5 illustrates a reception scheme performed by the base station 110.

Referring to FIG. 5, two consecutive FFT windows may be used to receive signals with different delays from a plurality of terminals UE 1, UE 2, UE 3, and UE 4. An FFT window may also be referred to as a reception window. When a reception window having a size of two consecutive reception windows is used, an entire OFDM symbol of each terminal is completely captured within the window, and thus power loss may not occur in the symbol to be decoded. In addition, complexity of a receiver may be reduced, compared to a case where at least one reception window configured based on a different timing for each terminal is used. However, interference occurs as some symbols causing interference are captured in addition to the symbol to be decoded, and thus a base station may perform decoding, based on an MUD method of removing interference by treating interference by the next symbol as a signal of a different terminal as described below.

Referring to FIG. 5, the base station receives an uplink signal 510, an uplink signal 520, an uplink signal 530, and an uplink signal 540 from UE 1, UE 2, UE 3, and UE 4, respectively. In a situation indicated by reference number 500, the base station may capture signals using a reception window 505 to decode a first symbol of each of the uplink signals 510, 520, 530, and 540. In this case, a portion of a second symbol of each of the uplink signals 510, 520, 530, and 540 may be captured together with the first symbol of each of the uplink signals 510, 520, 530, and 540. The base station may perform joint decoding of the first symbol and the second symbol for each of UE 1, UE 2, UE 3, and UE 4. That is, the base station may identify the two symbols received from each of the four UEs as signals having different delays received from eight UEs, thereby treating the second symbol of each of the uplink signals 510, 520, 530, and 540 as an interference signal from a different user. Accordingly, the base station may perform MUD and may detect the first symbol of each of the uplink signals 510, 520, 530, and 540.

In a situation indicated by reference number 550, the base station may capture signals using a reception window 555 and may decode the second symbol of each of the uplink signals 510, 520, 530, and 540. In this case, a portion of the first symbol and a portion of a third symbol of each of the uplink signals 510, 520, 530, and 540 may be captured together with the second symbol of each of the uplink signals 510, 520, 530, and 540. As in the situation 500, the base station may perform joint decoding of the second symbol and the third symbol for each of UE 1, UE 2, UE 3, and UE 4. That is, the base station may identify the two symbols received from each of the four UEs as signals having different delays received from eight UEs, thereby treating the first symbol and the third symbol of each of the uplink signals 510, 520, 530, and 540 as interference signals from a different user. Further, the base station may regenerate and cancel a portion of the first symbol in order to remove interference from the first symbol, thereby accurately decoding the second symbol.

According to various embodiments, a receiver using various schemes, such as successive interference cancellation (SIC), parallel interference cancellation (PIC), and a message passing algorithm (MPA), may be taken into consideration in order to perform MUD.

Figure 6:
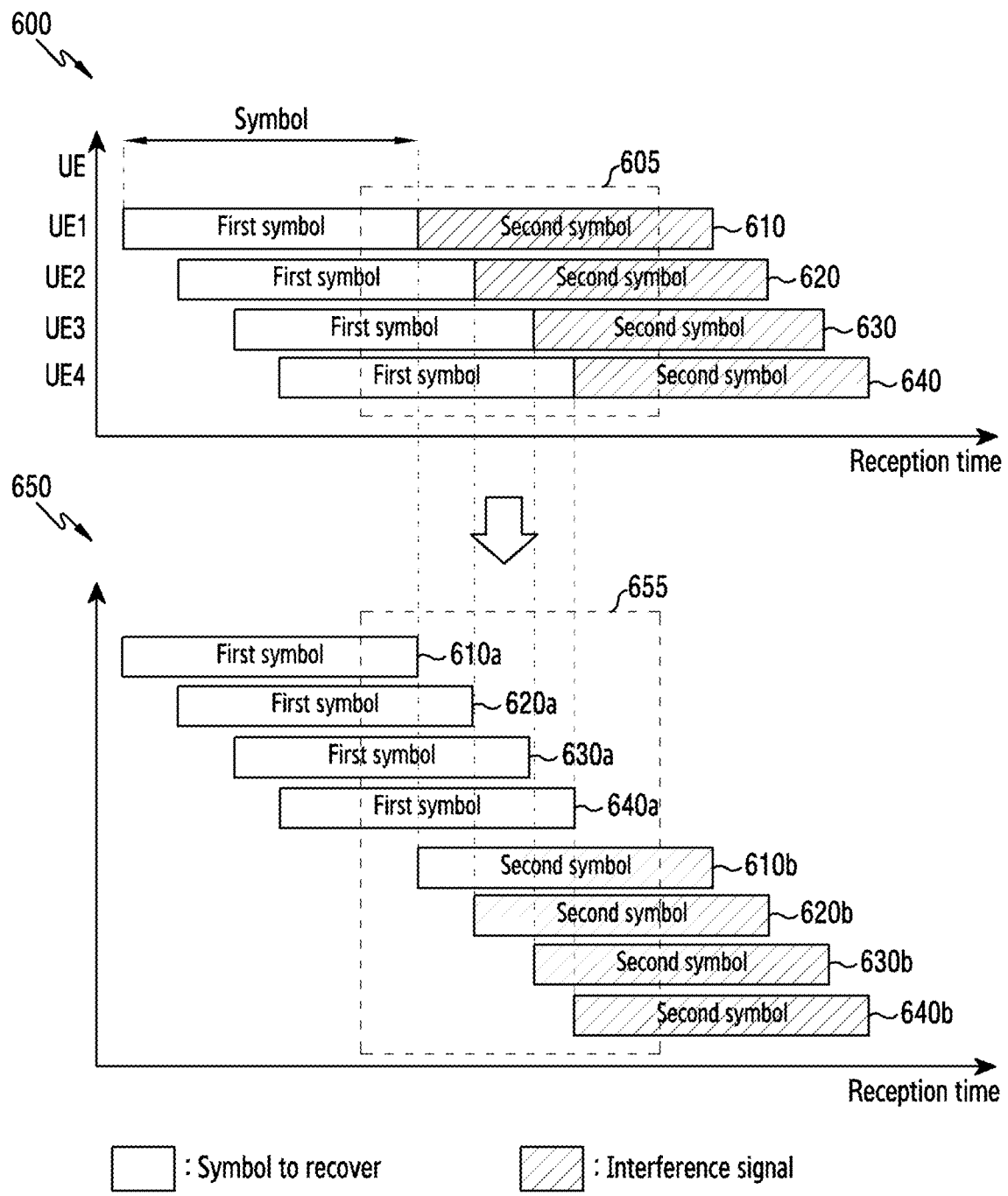
FIG. 6 illustrates an example of a multi-user detection (MUD) for controlling inter-symbol interference in a wireless communication system according to various embodiments.

FIG. 6 illustrates an example of an MUD for controlling inter-symbol interference in a wireless communication system according to various embodiments. FIG. 6 illustrates MUD performed by the base station 110.

Referring to FIG. 6, in a situation indicated by reference number 600, the base station may capture an uplink signal 610, an uplink signal 620, an uplink signal 640, and an uplink signal 640, received with different delays from UE 1, UE 2, UE 3, and UE 4, respectively, using a reception window 605.

In a situation indicated by reference number 650, it is shown that the base station identifies a first symbol and a second symbol of each of the four terminals UE 1, UE 2, UE 3, and UE 4 as symbols received from different terminals. Specifically, the base station may identify first symbols as symbols 610a, 620a, 630a, and 640a received from different respective terminals. In addition, the base station may identify second symbols as symbols 610b, 620b, 630b, and 640b received from terminals different from terminals transmitting the first symbols. That is, the base station may decode each symbol considering that the symbols 610a, 620a, 630a, 640a, 610b, 620b, 630b, and 640b are respectively received from eight different terminals.

In a system supporting NOMA, terminals may individually generate an uplink signal using an MA signature and may transmit the generated uplink signal to the base station. The base station may distinguish signals of different terminals overlapping on the same resource, based on the MA signature.

Accordingly, when the foregoing reception scheme is used in an asynchronous transmission environment in which NOMA is supported, deterioration in reception performance may occur due to a collision between MA signatures selected by a plurality of terminals. That is, since terminals individually select an MA signature to be used without signaling from the base station, a plurality of terminals using the same resource may select the same MA signature. For example, a first symbol 610a transmitted by UE 1 and a first symbol 620a transmitted by UE 2 are configured based on the same MA signature, and thus an MA signature collision may occur. In this case, although the base station may perform joint decoding on consecutive symbols using a reception window, it may be difficult to effectively separate and detect a signal.

Further, in the MUD scheme, consecutive symbols received from the same terminal are treated as separate symbols received from different terminals. Therefore, even when one terminal uses the same MA signature in two consecutive symbols, an MA signature collision may occur. For example, in FIG. 6, both the first symbol 610a and a second symbol 610b are transmitted by UE 1 but may be identified as symbols of different terminals. Therefore, when the first symbol 610a and the second symbol 610b are configured based on the same MA signature, an MA signature collision may occur.

In order to prevent deterioration in reception performance due to an MA signature collision described above, a method for effectively selecting an MA signature may be taken into consideration so that a collision between MA signatures does not occur. Hereinafter, embodiments for determining an MA signature are described in detail.

For convenience of description, the number of OFDM symbols transmitted by each terminal may be defined as $N_{sym}$, a signature may be defined as $S_n$, the total number of available signatures may be defined as $N_{sig}$, and a set of signatures selectable by each terminal may be defined as $\{S_0, S_1, S_2, \ldots, S_{N_{sig}-1}\}$. Each terminal may select signatures for $N_{sym}$ OFDM symbols from among a set of signatures $\{S_0, S_1, S_2, \ldots, S_{N_{sig}-1}\}$. Further, a sequence of signature indexes used by each terminal may be defined as $I=[I_0, I_1, \ldots, I_{N_{sym}-1}]$, where $I_n$ denotes the index of an MA signature for an nth symbol and satisfies $I_n \in \{0, 1, \ldots, N_{sig}-1\}$. In addition, a sequence of $N_{sym}$ signatures corresponding to sequence I of signature indexes may be defined as $$S^I = \left[S_{I_0}, S_{I_1}, \cdots, S_{I_{N_{sym}-1}}\right].$$

Here, a signature sequence refers to a sequence including signatures sequentially corresponding to symbols to be transmitted. A plurality of terminals asynchronously transmitting an NOMA-based OFDM symbol may transmit a signal by selecting a sequence of signatures from among the same set of signatures. The terminals may determine a signature sequence to be used, based on at least one of methods for allocating signature sequences to be described below.

In a first signature allocation method, an MA signature may be allocated in units of one OFDM symbol to prevent an MA signature collision between a plurality of terminals. That is, an MA signature may be allocated such that a collision does not occur between MA signatures respectively for nth symbols of terminals using different signature sequences. In order to prevent a collision between MA signatures in units of one OFDM symbol, a signature sequence may be configured to satisfy a condition of Equation 1.

If $k \neq m, I_n^k \neq I_n^m, \forall n \in \{0, 1, \ldots, N_{sym}-1\}$ [Equation 1]

Here, k and m denote numbers indicating a kth terminal and an mth terminal (i.e., terminal k and terminal m), respectively, n denotes a number indicating an n+1th OFDM symbol (i.e., OFDM symbol n+1 or OFDM symbol number n) transmitted by each terminal, $I_n^k$ denotes an MA signature index used for an n+1th OFDM symbol of the kth terminal, $I_n^m$ denotes an MA signature index used for an n+1th OFDM symbol of the mth terminal, and $N_{sym}$ denotes the number of OFDM symbols transmitted by terminals. When an MA signature sequence is configured to satisfy the condition of Equation 1, up to $N_{sig}$ signature sequences may be configured. Accordingly, each terminal may select one of up to $N_{sig}$ signature sequences and may perform encoding, based on the selected signature sequence. The first signature allocation method for allocating a signature in units of one OFDM symbol is shown in Table 1.

TABLE 1

| Signature sequence index | Signature per OFDM symbol | | | | |
|---|---|---|---|---|---|
| | First symbol | Second symbol | Third symbol | Fourth symbol | ... |
| 0 | $S_0$ | $S_1$ | $S_2$ | $S_3$ | ... |
| 1 | $S_1$ | $S_2$ | $S_3$ | $S_4$ | ... |
| ... | ... | ... | ... | ... | ... |
| $N_{sig} - 1$ | $S_{N_{sig}-1}$ | $S_0$ | $S_1$ | $S_2$ | ... |

Referring to Table 1, each terminal may use $N_{sig}$ MA signatures, that is, $S_0, S_1, S_2, \ldots, S_{N_{sig}-1}$. For example, when a first terminal selects signature sequence index 0, the first terminal may configure a signal in which different signatures are respectively applied to $N_{sym}$ OFDM symbols using MA signature sequence $[S_0, S_1, S_2, S_3, \ldots]$. A second terminal may select signature sequence index 1, different from that of the first terminal. In this case, the second terminal may configure a signal in which different signatures are respectively applied to $N_{sym}$ OFDM symbols using MA signature sequence $[S_1, S_2, S_3, S_4, \ldots]$. According to the first signature allocation method, different signatures may be applied to consecutive symbols transmitted by each terminal.

In a second signature allocation method, MA signatures may be allocated in units of two OFDM symbols to prevent an MA signature collision between a plurality of terminals. That is, an MA signature may be allocated such that a collision does not occur between MA signatures for an nth symbol and an n+1th symbol of terminals using different signature sequences. In order to prevent a collision between MA signatures in units of two OFDM symbols, a signature sequence may be configured to satisfy a condition of Equation 2.

If $k \neq m, I_n^k \neq I_{n+1}^k$ $I_n^k \neq I_n^m$ $I_n^k \neq I_{n+1}^m$, for $\forall n \in \{0, \ldots, N_{sym}-2\}$ [Equation 2]

Here, k and m denote numbers indicating a kth terminal and an m-th terminal (i.e., terminal k and terminal m), respectively, n denotes a number indicating an n+1th OFDM symbol (i.e., OFDM symbol n+1 or OFDM symbol number n) transmitted by each terminal, $I_n^k$ denotes an MA signature index used for an nth OFDM symbol of the kth terminal, $I_{n+1}^k$ denotes an MA signature index used for an n+1th OFDM symbol of the kth terminal, $I_n^m$ denotes an MA signature index used for an n+1th OFDM symbol of the mth terminal, $I_{n+1}^m$ denotes an MA signature index used for an n+2th OFDM symbol of the mth terminal, and $N_{sym}$ denotes the number of OFDM symbols transmitted by terminals. When an MA signature sequence is configured to satisfy the condition of Equation 2, up to $$M = \left\lfloor \frac{N_{sig}}{2} \right\rfloor$$

signature sets may be configured. Accordingly, each terminal may select one of up to M signature sets and may perform encoding, based on a signature sequence corresponding to the selected signature set. When the second signature allocation method is used, it is possible to prevent occurrence of a signature collision between consecutive symbols transmitted by different terminals in an asynchronous transmission environment, thereby improving reception performance. The second signature allocation method for allocating a signature in units of two OFDM symbols is shown in Table 2.

TABLE 2

| Signature sequence index | Signature per OFDM symbol | | | | |
|---|---|---|---|---|---|
| | First symbol | Second symbol | Third symbol | Fourth symbol | ... |
| 0 | $S_0$ | $S_1$ | $S_0$ | $S_1$ | ... |
| 1 | $S_2$ | $S_3$ | $S_2$ | $S_3$ | ... |
| ... | ... | ... | ... | ... | ... |
| M - 1 | $S_{2M-2}$ | $S_{2M-1}$ | $S_{2M-2}$ | $S_{2M-1}$ | ... |

Referring to Table 2, in the second signature allocation method, terminals may use one set among $$M = \left\lfloor \frac{N_{sig}}{2} \right\rfloor$$

MA signature sets, that is, $\{S_0, S_1\}, \{S_2, S_3\}, \ldots, \{S_{2M-2}, S_{2M-1}\}$. For example, when a first terminal selects signature sequence index 0, the first terminal may configure a signal in which different signatures are applied to consecutive OFDM symbols to be transmitted by the first terminal using a signature sequence corresponding to MA signature set $\{S_0, S_1\}$. A second terminal may select signature sequence index 1 different from that of the first terminal. In this case, the second terminal may configure a signal in which different signatures are applied to consecutive OFDM symbols to be transmitted by the second terminal using a signature sequence corresponding to MA signature set $\{S_2, S_3\}$. According to the second signature allocation method, different signatures may be applied to consecutive symbols transmitted by each terminal. In addition, when signature sequence indexes are different, different signature sets are used, and thus different signatures may be applied to symbols of different terminals captured in a reception window having a size of two FFT windows.

According to various embodiments, the first signature allocation method and the second signature allocation method may be determined by the base station. For example, when the number of terminals requesting access to a system is a threshold value or greater, the base station may determine to use the first signature allocation method in which a larger number of signature sequences are available. In addition, when a channel quality is a threshold value or less, the base station may determine to use the second signature allocation method capable of preventing a signature collision between different terminals in the same reception window. The base station may determine a signature allocation method, based on various criteria in addition to the foregoing criteria, and may transmit information about the determined signature allocation method to terminals.

In order to apply the foregoing signature allocation methods, each terminal needs to check whether NOMA is used, and information about available MA signature sequences when NOMA is used. Hereinafter, FIG. 7 illustrates a specific operation in which a base station indicates at least one of the foregoing signature allocation methods to a terminal or to decode signals received from a plurality of terminals, based on the indicated signature allocation method.

Figure 7:
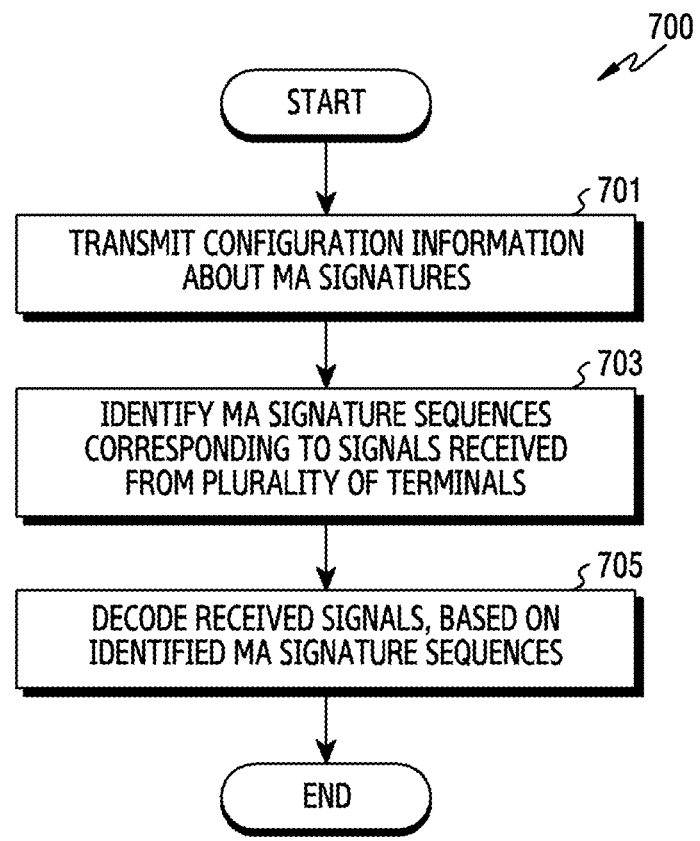
FIG. 7 illustrates a flowchart of a method for a base station in a wireless communication system according to various embodiments.

FIG. 7 illustrates a flowchart of a method for a base station in a wireless communication system according to various embodiments. FIG. 7 illustrates an operating method of the base station 110.

Referring to FIG. 7, in operation 701, the base station transmits configuration information about MA signatures. Specifically, the base station configures parameters related to a method for allocating MA signatures and may transmit information about whether NOMA is used and configuration information about available MA signature sequences using various types of signaling. For example, the base station may transmit configuration information about MA signatures using system information transmitted through a broadcasting channel. In another example, the base station may transmit the configuration information about the MA signatures to terminals through radio resource control (RRC) signaling. In still another example, the base station may transmit the configuration information about the MA signatures using a system information block (SIB). Pieces of information that can be included in the configuration information about the MA signatures are shown in Table 3.

TABLE 3

| Information element (IE) | Description |
| --- | --- |
| Resource for NOMA transmission | Location information about resource region which is allowed for NOMA-based asynchronous transmission |
| Available MA signature information | Information indicating MA signatures available for each OFDM symbol |
| Signature collision avoidance parameter | Symbol unit for signature collision avoidance (1, 2) |

Referring to Table 3, the configuration information about the MA signatures may include information indicating a resource region in which terminals are allowed to transmit a signal using NOMA. Further, the configuration information about the MA signatures may include information indicating MA signatures available for terminals. For example, referring to Table 1 and Table 2, $S_0, S_1, S_2, \ldots, S_{N_{sig}-1}$ may be indicated as available MA signatures. Further, the configuration information about the MA signatures may include information indicating a symbol unit for signature collision avoidance. For example, when 1 is indicated as the symbol unit, the first allocation method of allocating a signature in units of one OFDM symbol may be applied, and when 2 is indicated as the symbol unit, the second allocation method of allocating a signature in units of two OFDM symbols may be applied. IE terms shown in Table 3 to refer to the pieces of information included in the configuration information are for convenience of description, and the disclosure is not limited thereto. In addition, the configuration information may include additional pieces of information for configuring an MA signature.

In operation 703, the base station identifies MA signature sequences corresponding to signals received from a plurality of terminals. In order for the base station to decode a signal based on an MA signature sequence selected by each of the plurality of terminals based on the configuration information, information about an MA signature sequence selected by each terminal may be required. The information about the MA signature sequence selected by each terminal may be obtained by the base station according to various methods. For example, the base station may receive information indicating an MA signature sequence selected by a terminal from the terminal through additional signaling. In another example, the base station may detect a preamble index included in a preamble transmitted from a terminal, and may identify an MA signature sequence used by the terminal, based on a mapping relationship between a preamble index and an MA signature sequence index. In this case, the base station and the terminal may store in advance information about the mapping relationship between the preamble index and the MA signature sequence index. According to various embodiments, when the number of preambles that can be used by terminals is less than the number of available MA signature sequences, the mapping relationship between the preamble index and the MA signature sequence index may be defined so that a collision does not occur between MA signature sequences as long as a collision does not occur between preambles.

In operation 705, the base station decodes the received signals, based on the identified MA signature sequences. For example, the base station may decode a signal of a terminal using an MA signature sequence, based on the MA signature sequence directly obtained through additional signaling from the terminal. In another example, the base station may decode a signal of a terminal using an MA signature sequence, based on the MA signature sequence identified based on a preamble index from the terminal. In this case, the base station may use a mapping relationship between a preamble index and an MA signature sequence index corresponding to a method for allocating MA signatures (e.g., the first signature allocation method or the second signature allocation method) configured to be used in a system.

Figure 8:
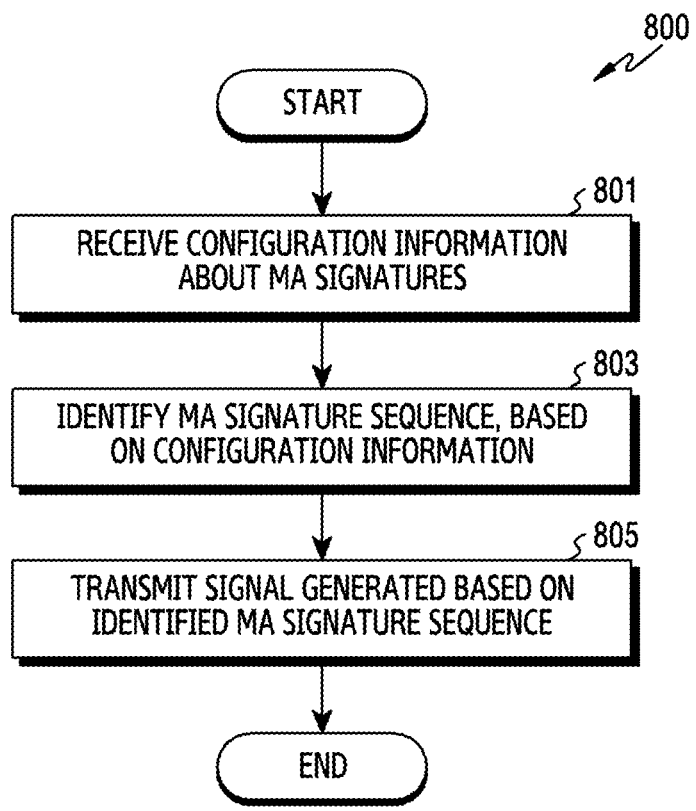
FIG. 8 illustrates a flowchart of a method for a terminal in a wireless communication system according to various embodiments.

Hereinafter, FIG. 8 illustrates a specific operation of a terminal for configuring a signal, based on configuration information about an MA signature in order to apply an MA signature allocation method for preventing a collision between MA signatures as described above.

FIG. 8 illustrates a flowchart of a method for a terminal in a wireless communication system according to various embodiments. FIG. 8 illustrates an operating method of the terminal 120.

Referring to FIG. 8, in operation 801, the terminal receives configuration information about MA signatures. Specifically, the terminal may receive whether NOMA is used and configuration information about available MA signature sequences, which are configured by a base station, using various types of signaling. For example, the terminal may receive configuration information about MA signatures using system information transmitted through a broadcasting channel. In another example, the terminal may receive the configuration information about the MA signatures from the base station through RRC signaling. In still another example, the terminal may receive the configuration information about the MA signatures using an SIB. The configuration information about the MA signatures received by the terminal may include the foregoing pieces of information shown in Table 3. The IE terms shown in Table 3 to refer to the pieces of information included in the configuration information are for convenience of description, and the disclosure is not limited thereto. In addition, the configuration information may include additional pieces of information for configuring an MA signature.

In operation 803, the terminal identifies an MA signature sequence, based on the configuration information. The terminal may identify whether NOMA is used and available MA signature sequences, based on the configuration information about the MA signatures. Specifically, the terminal may identify a resource region in which terminals are allowed to transmit a signal using NOMA, based on the configuration information. Further, the terminal may obtain information about MA signatures available for terminals, based on the configuration information. For example, referring to Table 1 and Table 2, the terminal may identify that $S_0, S_1, S_2, \ldots, S_{N_{sig}-1}$ are available. In addition, the terminal may identify a symbol unit for signature collision avoidance, based on configuration information. For example, when 1 is indicated as the symbol unit, the UE identifies that a signature allocation method is the first allocation method, and when 2 is indicated as the symbol unit, the UE identifies that the signature allocation method is the second allocation method.

In operation 805, the UE transmits a signal generated based on the identified MA signature sequence. The terminal may identify available MA signature sequences, based on MA signatures and the signature allocation method indicated through the configuration information. For example, when the signature allocation method is indicated as the first allocation method, the terminal may identify that $N_{sig}$ signature sequences, in which the order of $S_0, S_1, S_2, \ldots, S_{N_{sig}-1}$ is changed, are available, and may select one of the $N_{sig}$ signature sequences. When the signature allocation method is indicated as the second allocation method, the terminal may identify that signature sequences respectively corresponding to $$M = \left\lfloor \frac{N_{sig}}{2} \right\rfloor$$

MA signature sets, that is, $\{S_0, S_1\}, \{S_2, S_3\}, \ldots, \{S_{2M-2}, S_{2M-1}\}$, are available and may select one of the $$M = \left\lfloor \frac{N_{sig}}{2} \right\rfloor$$

MA signature sets. The terminal may select an MA signature sequence according to various methods. For example, the terminal may randomly select one signature sequence among signature sequences identified as available. In another example, the terminal may select a signature sequence, based on a mapping relationship between a preamble index selected for transmission of a preamble and an MA signature sequence index. In this case, the base station and the terminal may store in advance information about the mapping relationship between the preamble index and the MA signature sequence index. A criterion for selecting the MA signature sequence is not limited to the foregoing methods, and the terminal may select an MA signature sequence according to various criteria.

As illustrated in FIG. 7 and FIG. 8, a mapping relationship between a preamble index and an MA signature sequence index may be used to prevent a collision between MA signature sequences and to allow the base station to identify an MA signature sequence used by the terminal without additional signaling.

In the first signature allocation method, the terminal and the base station may identify a signature sequence according to Equation 3.

$$I_n^k \equiv +\alpha \cdot n \pmod{N_{sig}}, \alpha \text{ is constant} \quad \text{[Equation 3]}$$

Here, k denotes a number indicating a kth terminal (i.e., terminal k), n denotes a number indicating an n+1th OFDM symbol (i.e., OFDM symbol n+1 or OFDM symbol number n) transmitted by a terminal where n is in a range of $\{0, 1, \ldots, N_{sym}-1\}$, $I_n^k$ denotes an MA signature index used for an n+1th OFDM symbol of the kth terminal, $p_k$ denotes a preamble index of the kth terminal, $N_{sig}$ denotes the number of available signature sequences, and $\alpha$ denotes a predetermined constant. Signature sequence indexes mapped to respective preamble indexes to satisfy Equation 3 and signature sequences are shown in Table 4.

TABLE 4

| Preamble index | Signature per OFDM symbol number | | | | | |
|---|---|---|---|---|---|---|
| | 0 | 1 | 2 | 3 | 4 | 5 |
| 0 | $S_0$ | $S_1$ | $S_2$ | $S_3$ | $S_4$ | $S_5$ |
| 1 | $S_1$ | $S_2$ | $S_3$ | $S_4$ | $S_5$ | $S_6$ |
| 2 | $S_2$ | $S_3$ | $S_4$ | $S_5$ | $S_6$ | $S_7$ |
| 3 | $S_3$ | $S_4$ | $S_5$ | $S_6$ | $S_7$ | $S_8$ |
| 4 | $S_4$ | $S_5$ | $S_6$ | $S_7$ | $S_8$ | $S_9$ |
| 5 | $S_5$ | $S_6$ | $S_7$ | $S_8$ | $S_9$ | $S_{10}$ |
| ... | ... | ... | ... | ... | ... | ... |

Referring to Table 4, when one of the preamble indexes is selected by the terminal, one of the signature sequence indexes for signature sequences used in the first allocation method may be selected. When a first terminal selects preamble index 0, the first terminal may configure a signal in which different signatures are respectively applied to $N_{sym}$ OFDM symbols using MA signature sequence [$S_0, S_1, S_2, S_3, S_4, S_5, \ldots$]. A second terminal may select preamble index 1. In this case, the second terminal may configure a signal in which different signatures are respectively applied to $N_{sym}$ OFDM symbols using MA signature sequence [$S_1, S_2, S_3, S_4, S_5, S_6, \ldots$]. According to the first signature allocation method, different signatures may be applied to consecutive symbols transmitted by each terminal. Therefore, the terminal may select a preamble index and may transmit a signal using a signature sequence configured according to a signature sequence index satisfying Equation 3. In addition, the base station may detect a preamble sequence from a preamble received from the terminal and may then identify a signature sequence satisfying Equation 3, thereby decoding a signal of the terminal.

In the second signature allocation method, the terminal and the base station may identify a signature sequence according to Equation 4.

$$I_{2n}^k \equiv 2p_k \pmod{2M}$$

$$I_{2n+1}^k = I_{2n}^k + 1, \text{ for } \forall n \in \{0,1,\ldots,M-1\} \quad \text{[Equation 4]}$$

Here, k denotes a number indicating a kth terminal (i.e., terminal k), n denotes a number indicating consecutive symbols with symbol number 2n and symbol number 2n+1 transmitted by a terminal where n is in a range of $\{0, 1, \ldots, M-1\}$ and $$M = \left\lfloor \frac{N_{sig}}{2} \right\rfloor,$$

$I_{2n}^k$ denotes an mA signature index used for an OFDM symbol with symbol number 2n of the kth terminal, $I_{2n+1}^k$ denotes an MA signature index used for an OFDM symbol with symbol number 2n+1 of the kth terminal, $p_k$ denotes a preamble index of the kth terminal, and $N_{sig}$ denotes the number of available signature sequences. Signature sequence indexes mapped to respective preamble indexes to satisfy Equation 4 and signature sequences are shown in Table 5.

TABLE 5

| Preamble index | Signature per OFDM symbol number | | | | | |
|---|---|---|---|---|---|---|
| | 0 | 1 | 2 | 3 | 4 | 5 |
| 0 | $S_0$ | $S_1$ | $S_0$ | $S_4$ | $S_0$ | $S_1$ |
| 1 | $S_2$ | $S_3$ | $S_2$ | $S_3$ | $S_2$ | $S_3$ |
| 2 | $S_4$ | $S_5$ | $S_4$ | $S_5$ | $S_4$ | $S_5$ |
| 3 | $S_6$ | $S_7$ | $S_6$ | $S_7$ | $S_6$ | $S_7$ |
| 4 | $S_8$ | $S_9$ | $S_8$ | $S_9$ | $S_8$ | $S_9$ |
| 5 | $S_{10}$ | $S_{11}$ | $S_{10}$ | $S_{11}$ | $S_{10}$ | $S_{11}$ |
| ... | ... | ... | ... | ... | ... | ... |

Referring to Table 5, when one of the preamble indexes is selected by the terminal, a signature sequence index for one signature sequence among signature sequences corresponding to MA signature sets, that is, $\{S_0, S_1\}, \{S_2, S_3\}, \ldots, \{S_{2M-2}, S_{2M-1}\}$, used in the second allocation method may be selected. That is, one signature sequence index mapped to a preamble index selected according to Equation 4 may be determined. For example, when a first terminal selects preamble index 0, the first terminal may configure a signal in which different signatures are applied to consecutive OFDM symbols to be transmitted by the first terminal using a signature sequence corresponding to MA signature set $\{S_0, S_1\}$. A second terminal may select preamble index 1. In this case, the second terminal may configure a signal in which different signatures are applied to consecutive OFDM symbols to be transmitted by the second terminal using a signature sequence corresponding to MA signature set $\{S_2, S_3\}$. According to the second signature allocation method, different signatures may be applied to consecutive symbols transmitted by each terminal and symbols of different terminals captured in the same reception window. Therefore, the terminal may select a preamble index and may transmit a signal using a signature sequence configured according to a signature sequence index satisfying Equation 4. In addition, the base station may detect a preamble index from a preamble received from the terminal and may then identify a signature sequence satisfying Equation 4, thereby decoding a signal of the terminal. The mapping relationship between a preamble index and a signature sequence index is not limited to the foregoing rule but may be determined according to various methods.

Figure 9:
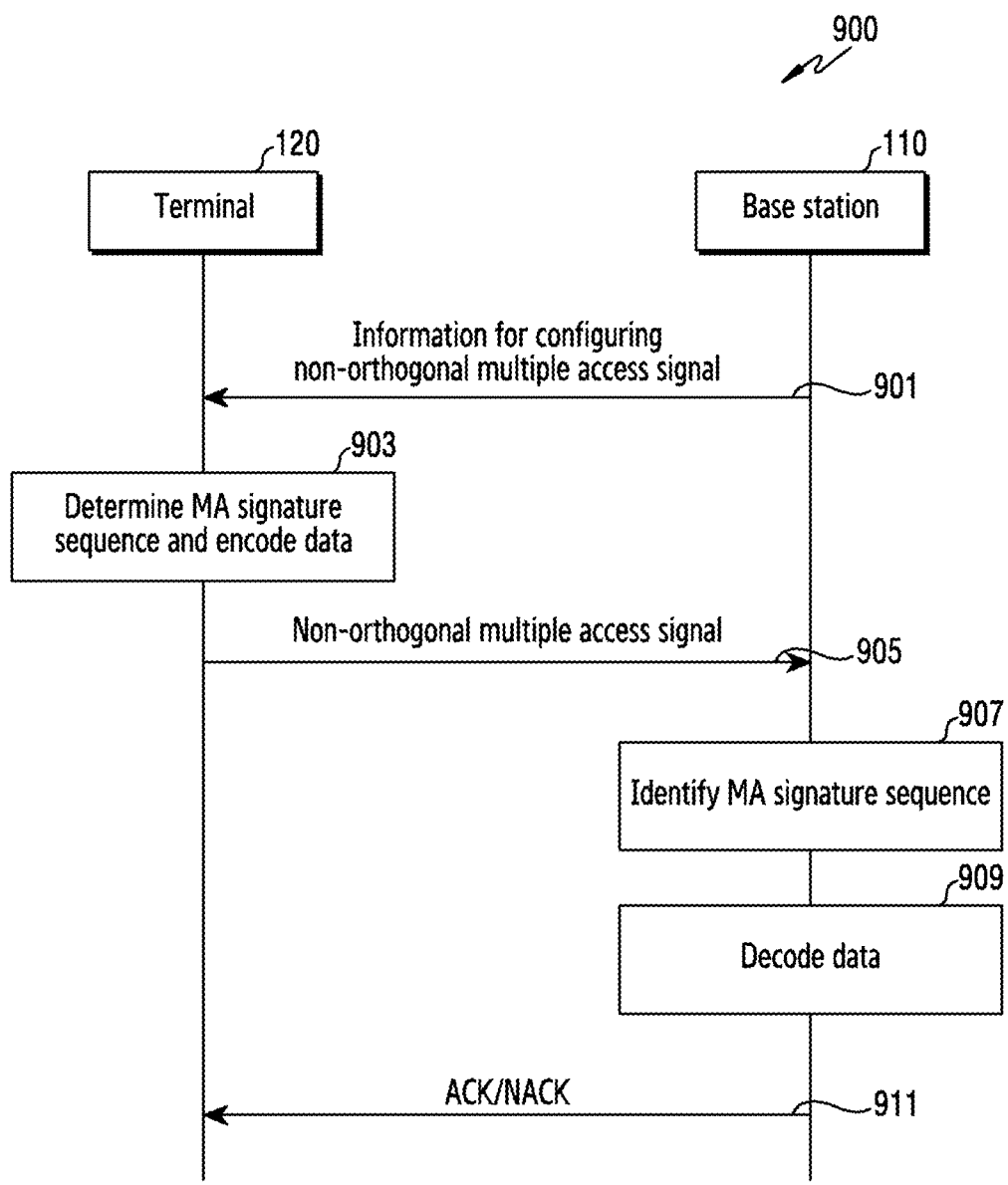
FIG. 9 illustrates a signal exchange diagram when an uplink is not synchronized in a wireless communication system according to various embodiments.

FIG. 9 illustrates a signal exchange diagram when an uplink is not synchronized in a wireless communication system according to various embodiments. FIG. 9 illustrates signal flow between the base station 110 and the terminal 120.

Referring to FIG. 9, in operation 901, the base station 110 transmits information for configuring a non-orthogonal multiple access signal to the terminal 120. The terminal 120 receives the information for configuring the non-orthogonal multiple access signal from the base station 110. The information for configuring the non-orthogonal multiple access signal may be understood as configuration information about MA signatures described with reference to FIG. 7. Accordingly, as shown in Table 3, the information for configuring the non-orthogonal multiple access signal may include information indicating a resource region which is allowed for terminals 120 to transmit a signal using NOMA, information indicating MA signatures available for terminals 120, and information indicating a symbol unit for signature collision avoidance.

In operation 903, the terminal 120 determines an MA signature and encodes data. The terminal 120 may identify a resource for transmitting data using NOMA and available MA signature sequences, based on the information for configuring the non-orthogonal multiple access signal. That is, the terminal 120 may identify available MA signature sequences from MA signatures indicated by the base station 110 according to a signature allocation method identified based on a symbol unit for signature collision avoidance. The terminal 120 may determine one of MA signature sequences identified according to one of the first signature allocation method or the second signature allocation method and may encode data using the determined signature sequence. In this case, the terminal 120 may determine one of the MA signature sequences, based on a selected preamble index.

In operation 905, the terminal 120 transmits a non-orthogonal multiple access signal to the base station 110. The base station 110 receives the non-orthogonal multiple access signal from the terminal 120. The terminal 120 may transmit a signal to the base station 110 through at least a portion of a resource region identified from the information for configuring the non-orthogonal multiple access signal. In this case, the terminal 120 may transmit a data signal generated using a preamble and an MA signature sequence.

In operation 907, the base station 110 identifies the MA signature sequence. The base station 110 may obtain information about the MA signature sequence for decoding the signal received from the terminal 120. For example, the base station 110 may receive information indicating an MA signature sequence selected by the terminal 120 from the terminal 120 through additional signaling. In another example, the base station 110 may detect a preamble index included in a preamble transmitted from the terminal 120 and may identify an MA signature sequence used by the terminal 120, based on a mapping relationship between a preamble index and an MA signature sequence index. In this case, the base station 110 and the terminal 120 may store in advance information about the mapping relationship between the preamble index and the MA signature sequence index.

In operation 909, the base station 110 decodes data. Specifically, the base station 110 decodes a received signal, based on the identified MA signature sequence. For example, the base station 110 may decode data of the terminal 120 using an MA signature sequence, based on the MA signature sequence directly obtained from the terminal 120 through additional signaling. In another example, the base station 110 may decode data of the terminal 120 using an MA signature sequence, based on the MA signature sequence identified based on a preamble index from the terminal 120. In this case, the base station 110 may use a mapping relationship between a preamble index and an MA signature sequence index corresponding to a method for allocating MA signatures (e.g., the first signature allocation method or the second signature allocation method) configured to be used in a system.

In operation 911, the base station 110 transmits an acknowledgment (ACK) signal or a negative acknowledgment (NACK) signal to the terminal 120. The terminal 120 receives the ACK signal or the NACK signal from the base station 110. Specifically, when the data received from the terminal 120 is successfully decoded, that is, when it is determined that the data affected by interference has been successfully recovered, the base station 110 may transmit an ACK signal to the terminal 120. In this case, the base station 110 may transmit a data signal to the terminal 120. When decoding of the data fails, that is, when it is determined that recovery of the data has failed or has not been completed, the base station 110 may transmit a NACK signal to the terminal 120. According to various embodiments, the base station 110 may further transmit a response signal to a preamble received from the terminal 120.

Signaling between the base station 110 and the terminal 120 illustrated in FIG. 9 may be applied when the terminal 120 is in an idle state of is not connected to the base station 110, when the terminal 120 is connected to the base station 110 but uplink synchronization is not established, or in a grant-free system in which the terminal 120 can perform uplink transmission without receiving a scheduling permission signal from the base station 110.

Figure 10:
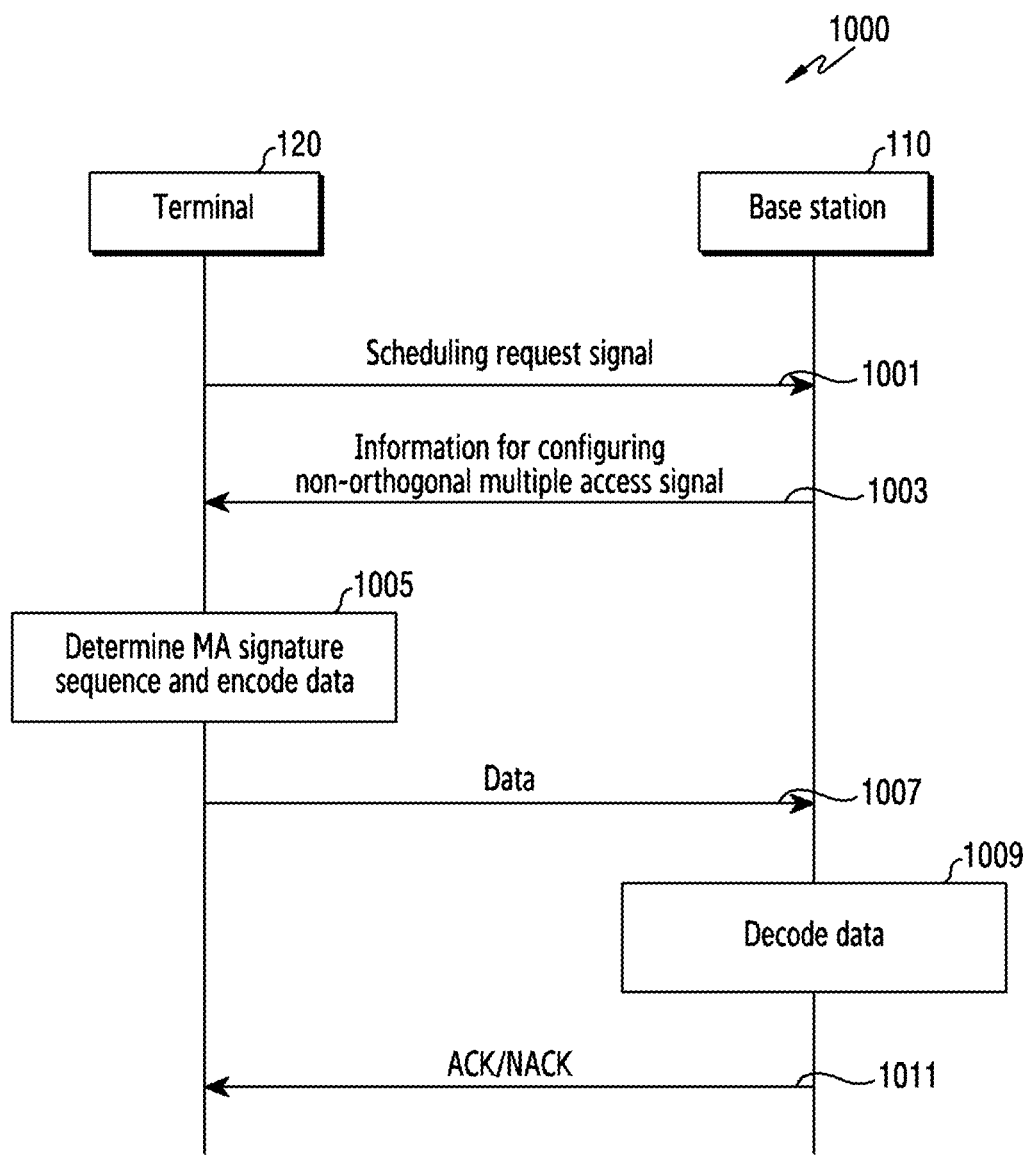
FIG. 10 illustrates a signal exchange diagram when an uplink is synchronized in a wireless communication system according to various embodiments.

FIG. 10 illustrates a signal exchange diagram when an uplink is synchronized in a wireless communication system according to various embodiments. FIG. 10 illustrates signal flow between the base station 110 and the terminal 120.

Referring to FIG. 10, in operation 1001, the terminal 120 transmits a scheduling request signal to the base station 110. The base station 110 receives the scheduling request signal from the terminal 120. The terminal 120 may transmit the scheduling request signal for requesting resource allocation for uplink transmission to the base station 110.

In operation 1003, the base station 110 transmits information for configuring a non-orthogonal multiple access signal to the terminal 120. The terminal 120 receives the information for configuring the non-orthogonal multiple access signal from the base station 110. When receiving the scheduling request signal from the terminal 120, the base station 110 may transmit the information for configuring the non-orthogonal multiple access signal to the terminal 120. In this case, the information for configuring the non-orthogonal multiple access signal may be transmitted to each terminal 120 without going through a broadcasting channel. Accordingly, the base station 110 may transmit information indicating a signature sequence to be allocated to the terminal 120. That is, the base station 110 may directly and individually allocate signature sequences to be used by terminals 120. According to various embodiments, the base station 110 may allocate a signature sequence for each terminal 120, based on the first signature allocation method, the second signature allocation method, or another predetermined method, so that a collision does not occur between signatures for terminals 120. According to various embodiments, the base station 110 may allocate a single signature sequence for each terminal 120 or may allocate a plurality of signature sequences for each terminal 120.

In operation 1005, the terminal 120 determines an MA signature sequence and encodes data. The terminal 120 may identify an allocated signature sequence, based on the information for configuring the non-orthogonal multiple access signal received from the base station 110. When one signature sequence is allocated by the base station 110, the terminal 120 may encode the data using the allocated signature sequence. Alternatively, when a plurality of signature sequences is allocated by the base station 110, the terminal 120 may determine one signature sequence, based on a predetermined rule and may encode the data using the determined signature sequence. In this case, the base station 110 and the terminal 120 may store in advance a rule for determining one from among a plurality of signature sequences.

In operation 1007, the terminal 120 transmits the data to the base station 110. The base station 110 receives the data from the terminal 120. The terminal 120 may transmit the data to the base station 110 through a resource allocated by the base station 110 in response to the scheduling request signal. In this case, the terminal 120 may transmit a data signal generated using a signature sequence allocated by the base station 110.

In operation 1009, the base station 110 decodes the data. Specifically, the base station 110 may decode the received signal, based on the MA signature sequence allocated to the terminal 120. When one signature sequence is allocated by the base station 110, the base station 110 may decode the data using the allocated signature sequence. Alternatively, when a plurality of signature sequences is allocated by the base station 110, the base station 110 may identify one signature sequence, based on a predetermined rule and may decode the data using the identified signature sequence. In this case, the base station 110 and the terminal 120 may store in advance the rule for determining one of a plurality of signature sequences.

In operation 1011, the base station 110 transmits an ACK signal or a NACK signal to the terminal 120. The terminal 120 receives the ACK signal or the NACK signal from the base station 110. Specifically, when the data received from the terminal 120 is successfully decoded, that is, when it is determined that the data affected by interference has been successfully recovered, the base station 110 may transmit an ACK signal to the terminal 120. In this case, the base station 110 may transmit a data signal to the terminal 120. When decoding of the data fails, that is, when it is determined that recovery of the data has failed or has not been completed, the base station 110 may transmit a NACK signal to the terminal 120.

Signaling between the base station and the terminal illustrated in FIG. 10 may be applied when the terminal is connected to the base station and uplink synchronization is established.

According to an embodiment, a method operated by a terminal in a wireless communication system, the method comprises receiving, from a base station, configuration information associated with a plurality of signatures for a non-orthogonal multiple access (NOMA), the plurality of signatures comprising first signatures and second signatures; identifying a first signature sequence for the terminal based on the configuration information; and transmitting, to the base station, data based on the identified first signature sequence, the first signature sequence is configured by repeating the first signatures that are respectively applied to consecutive symbols of the data.

In some embodiments, the configuration information comprises at least one of information indicating a resource region allowed for a NOMA-based transmission, available signature, or a symbol unit for avoiding a collision between the available signatures.

In some embodiments, the identifying of the first signatures sequence for the terminal comprises identifying the plurality of signatures as available signatures based on the configuration information; identifying a symbol unit for avoiding a collision between the available signatures based on the configuration information; and identifying, based on the plurality of signatures, a set of signatures comprising a corresponding number of signatures to the identified symbol unit.

In some embodiments, the identifying of the first signatures sequence for the terminal comprises identifying a signature sequence index for the first signature sequence among signature sequences corresponding to the set of signatures based on a predetermined criterion.

In some embodiments, the identifying of the first signature sequence for the terminal comprises identifying a signature sequence index corresponding to the first signature sequence, the signature sequence index is determined based on a preamble index for the terminal.

In some embodiments, the transmitting of the data comprises transmitting the data through at least a portion of a resource region for a NOMA-based transmission identified based on the configuration information.

In some embodiments, a second signature sequence configured by repeating the second signatures is used to configure another data for a different terminal to transmit to the base station, and the other data of the different terminal is transmitted on resources at least partly overlapping the resource region for the NOMA-based transmission.

In some embodiments, the receiving of the configuration information comprises at least one of receiving the configuration information through a broadcasting channel; receiving the configuration information through a radio resource control (RRC) message; or receiving the configuration information through a system information block (SIB).

According to an embodiment, a method operated by a base station in a wireless communication system, the method comprises transmitting, to a plurality of terminals, configuration information associated with a plurality of signatures for a non-orthogonal multiple access (NOMA), the plurality of signatures comprising first signatures and second signatures; identifying a first signature sequence for a first terminal based on signals received from a plurality of terminals comprising the first terminal; and decoding data received from the first terminal based on the identified first signature sequence, the first signature sequence is configured by repeating the first signatures that are respectively applied to consecutive symbols of the data.

In some embodiments, the configuration information comprises at least one of information indicating a resource region allowed for a NOMA-based transmission, available signatures, or a symbol unit for avoiding a collision between the available signatures.

In some embodiments, the identifying of the first signature sequence for the first terminal comprises receiving information indicating the first signature sequence from the first terminal.

In some embodiments, the identifying of the first signature sequence for the first terminal comprises detecting a preamble index comprised in a preamble of the first terminal; identifying a first signature sequence index for the first signature sequence based on the preamble index; and identifying the first signature sequence based on the first signature index.

In some embodiments, the identifying of the first signature sequence index comprises identifying the first signature sequence index based on a mapping relationship between preamble indexes and signature sequence indexes.

In some embodiments, the method further comprises receiving, from the plurality of terminals, the signals through at least a portion of a resource region for a NOMA-based transmission identified based on the configuration information.

In some embodiments, a second signature sequence configured by repeating the second signatures is used to configure second data for a second terminal that is different than the first terminal among the plurality of terminals, to transmit the second data to the base station, and the second data is transmitted on resources at least partly overlapping a resource region for the NOMA-based transmission.

In some embodiments, the transmitting of the configuration information comprises at least one of transmitting the configuration information through a broadcasting channel; transmitting the configuration information through a radio resource control (RRC) message; or transmitting the configuration information through a system information block (SIB).

According to an embodiment, a terminal in a wireless communication system, the terminal comprises a transceiver; and at least one processor operatively connected to the transceiver. the at least one processor is configured to: receive, from a base station, configuration information associated with a plurality of signatures for a non-orthogonal multiple access (NOMA), wherein the plurality of signatures comprising first signatures and second signatures; identify a first signature sequence for the terminal based on the configuration information; and transmit, to the base station, data based on the identified first signature sequence, the first signature sequence is configured by repeating the first signatures that are respectively applied to consecutive symbols of the data.

In some embodiments, the configuration information comprises at least one of information indicating a resource region allowed for a NOMA-based transmission, available signatures, or a symbol unit for avoiding a collision between the available signatures.

In some embodiments, the at least one processor is further configured to: identify the plurality of signatures as available signatures based on the configuration information; identify a symbol unit for avoiding a collision between the available signatures based on the configuration information; and identify, based on the plurality of signatures, a set of signatures comprising a corresponding number of signatures to the identified symbol unit.

In some embodiments, the at least one processor is further configured to identify a signature sequence index for the first signature sequence among signature sequences corresponding to the set of signatures based on a predetermined criterion.

In some embodiments, the at least one processor is further configured to identify a signature sequence index corresponding to the first signature sequence, the signature sequence index is determined based on a preamble index for the terminal.

In some embodiments, the at least one processor is further configured to transmit the data through at least a portion of a resource region for a NOMA-based transmission identified based on the configuration information.

In some embodiments, a second signature sequence configured by repeating the second signatures is used to configure another data for a different terminal to transmit to the base station, and the other data of the different terminal is transmitted on resources at least partly overlapping the resource region for the NOMA-based transmission.

In some embodiments, the at least one processor is further configured to at least one of: receive the configuration information through a broadcasting channel; receive the configuration information through a radio resource control (RRC) message; or receive the configuration information through a system information block (SIB).

According to an embodiment, a base station in a wireless communication system, the base station comprises a transceiver; and at least one processor operatively connected to the transceiver. the at least one processor is configured to: transmit, to a plurality of terminals, configuration information associated with a plurality of signatures for a non-orthogonal multiple access (NOMA), the plurality of signatures comprising first signatures and second signatures; identify a first signature sequence for a first terminal based on signals received from a plurality of terminals comprising the first terminal; and decode data received from the first terminal based on the identified first signature sequence, the first signature sequence is configured by repeating the first signatures that are respectively applied to consecutive symbols of the data.

In some embodiments, the configuration information comprises at least one of information indicating a resource region allowed for a NOMA-based transmission, available signatures, or a symbol unit for avoiding a collision between the available signatures.

In some embodiments, the at least one processor is further configured to receive information indicating the first signature sequence from the first terminal.

In some embodiments, the at least one processor is further configured to: detect a preamble index comprised in a preamble of the first terminal; identify a first signature sequence index for the first signature sequence based on the preamble index; and identify the first signature sequence based on the first signature index.

In some embodiments, the at least one processor is further configured to: identify the first signature sequence index based on a mapping relationship between preamble indexes and signature sequence indexes.

In some embodiments, the at least one processor is further configured to: receive, from the plurality of terminals, the signals through at least a portion of a resource region for a NOMA-based transmission identified based on the configuration information.

In some embodiments, a second signature sequence configured by repeating the second signatures is used to configure second data for a second terminal that is different than the first terminal among the plurality of terminals, to transmit the second data to the base station, and the second data is transmitted on resources at least partly overlapping a resource region for the NOMA-based transmission.

In some embodiments, the at least one processor is further configured to at least one of: transmit the configuration information through a broadcasting channel; transmit the configuration information through a radio resource control (RRC) message; or transmit the configuration information through a system information block (SIB).

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method operated by a base station in a wireless communication system, the method comprising:
   identifying, an allocation scheme to use among allocation schemes including a first allocation scheme and a second allocation scheme for multiple access (MA) signatures based on at least one of a number of terminals requesting to access or a channel quality between the base station and a terminal; wherein the first allocation scheme indicates to configure a MA signature sequence including a MA signature different from MA signatures of other MA signature sequences in units of one symbol and the second allocation scheme indicates to configure a MA signature sequence including a set of multiple MA signatures different from sets of multiple MA signatures of other MA signature sequences in a unit of multiple consecutive symbols;
   transmitting, to a plurality of terminals, configuration information including information on an available MA signatures for a non-orthogonal multiple access (NOMA) and information on the allocation scheme for the MA signatures;

receiving, from the terminal, data based on the MA signature sequence for the terminal;

identifying the MA signature sequence for the terminal based on signals received from the plurality of terminals including the terminal; and decoding data received from the terminal based on the identified MA signature sequence.

2. The method of claim 1, wherein the configuration information further comprises information indicating a resource region allowed for a NOMA-based transmission.

3. The method of claim 2, further comprising:

receiving, from the plurality of terminals, the signals through at least a portion of the resource region for a NOMA-based transmission identified based on the configuration information.

4. The method of claim 1, wherein transmitting the configuration information comprises at least one of:

transmitting the configuration information through a broadcasting channel;

transmitting the configuration information through a radio resource control (RRC) message; or transmitting the configuration information through a system information block (SIB).

5. A base station in a wireless communication system, the base station comprising:

at least one transceiver; and at least one processor operably coupled with the at least one transceiver, wherein the at least one processor is configured to:

identify, an allocation scheme to use among allocation schemes including a first allocation scheme and a second allocation scheme for multiple access (MA) signatures based on at least one of a number of terminals requesting to access or a channel quality between the base station and a terminal; wherein the first allocation scheme indicates to configure a MA signature sequence including a MA signature different from MA signatures of other MA signature sequences in units of one symbol and the second allocation scheme indicates to configure a MA signature sequence including a set of multiple MA signatures different from sets of multiple MA signatures of other MA signature sequences in a unit of multiple consecutive symbols;

transmit, to a plurality of terminals, configuration information including information on an available MA signatures for a non-orthogonal multiple access (NOMA) and information on the allocation scheme for the MA signatures;

receive, from the terminal, data based on the MA signature sequence for the terminal;

identify the MA signature sequence for the terminal based on signals received from the plurality of terminals including the terminal; and decode data received from the terminal based on the identified MA signature sequence.

6. The base station of claim 5, wherein the configuration information further comprises information indicating a resource region allowed for a NOMA-based transmission.

7. The base station of claim 5, wherein the at least one processor is further configured to:

receive, from the plurality of terminals, the signals through at least a portion of a resource region for a NOMA-based transmission identified based on the configuration information.

8. The base station of claim 5, the at least one processor is further configured to at least one of:

transmit the configuration information through a broadcasting channel;

transmit the configuration information through a radio resource control (RRC) message; or transmit the configuration information through a system information block (SIB).

* * * * *